United States Patent [19]
Hudson

[11] Patent Number: 4,805,859
[45] Date of Patent: Feb. 21, 1989

[54] APPARATUS FOR SECURING CONTAINERS TO MOVING PLATFORMS

[76] Inventor: Don Hudson, 218 Randall Dr., Biloxi, Miss. 39531

[21] Appl. No.: 117,042

[22] Filed: Nov. 5, 1987

[51] Int. Cl.$^4$ ............................................. A47G 23/02
[52] U.S. Cl. .................................. 248/148; 248/346; 248/678; 248/680; 410/77; 410/90
[58] Field of Search ............... 248/148, 149, 150, 154, 248/147, 146, 544, 678, 680, 346; 410/77, 80, 52, 90, 94; 312/250, 249, 111; 232/7; 43/54.1

[56] References Cited

U.S. PATENT DOCUMENTS

| | | | |
|---|---|---|---|
| 2,476,134 | 7/1949 | Care | 232/7 |
| 2,512,934 | 6/1950 | Hancock | 248/148 X |
| 4,095,364 | 6/1978 | Prine | 43/54.1 X |
| 4,382,733 | 5/1983 | Rodgers | 248/346 X |
| 4,700,923 | 10/1987 | Lewis, Jr. et al. | 248/680 X |

FOREIGN PATENT DOCUMENTS 2507032 10/1975 Fed. Rep. of Germany ...... 312/250

Primary Examiner—Ramon O. Ramirez
Attorney, Agent, or Firm—Alexander F. Norcross

[57] ABSTRACT

An attachment and means for anchoring a tackle box on a moving object, such as a boat, against the effects of heave and motion, has a frame upon which are two parallel interlocking rails which mate with corresponding interlocking grooves provided within the tackle box or within an attachment affixed to a tackle box's exterior surface. The design of the rail is particularly adapted to reduce the chance of injury to individuals working around the rails and to reduce the effect of impact and wear damage to the rails. The rails are of a substantially broad based inverted truncated prismoidal section, extending outward at an angle from a base of substantial width and having a substantially flat top. The edges of the rails are rounded to reduce the effects of wear and to eliminate the change of injury to a person contacting a rail while the tackle box is removed. Two forms of the rail are shown allowing for either horizontal or vertical mounting of a tackle box; a framework is shown for installing the rails against the sloping hull of a vessel to produce a horizontal or vertical mounting position.

5 Claims, 2 Drawing Sheets

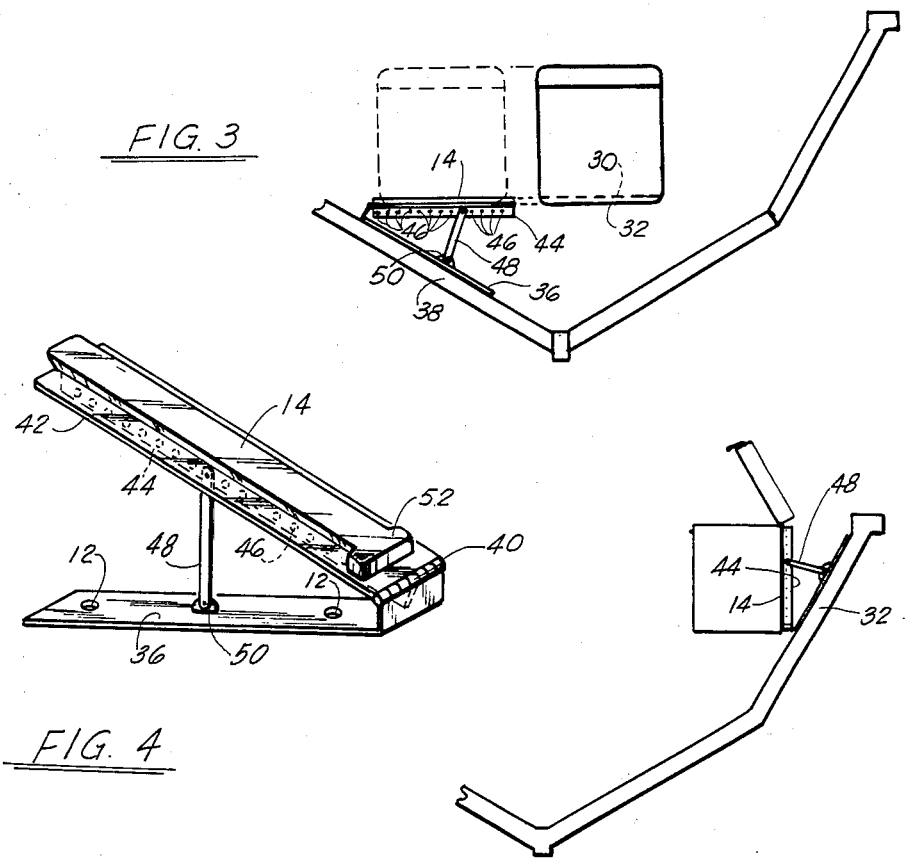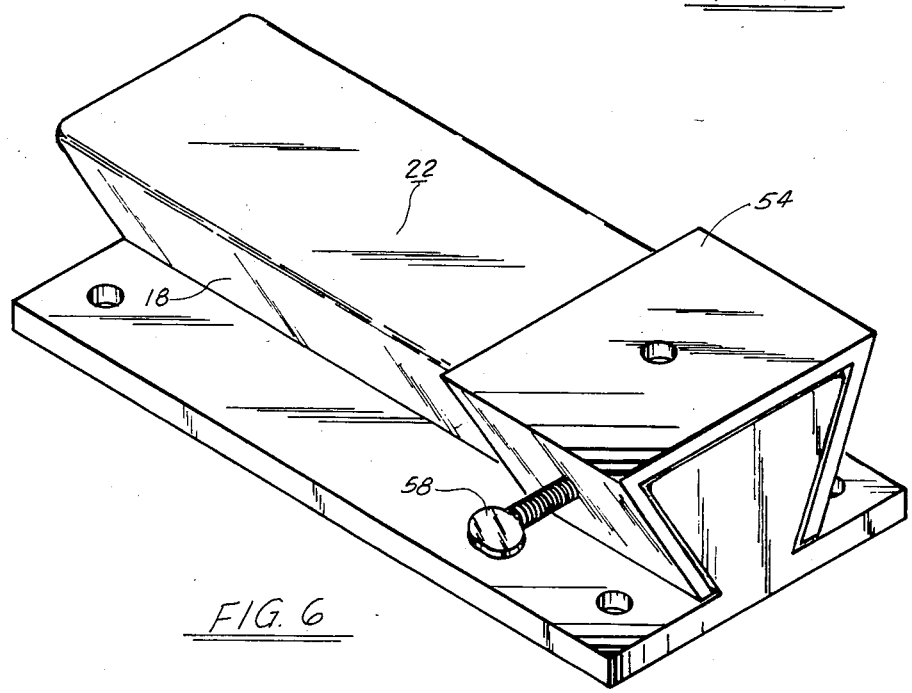

APPARATUS FOR SECURING CONTAINERS TO MOVING PLATFORMS

BACKGROUND OF THE INVENTION

The securing of items of equipment aboard vessels at sea is an old and notorious problem. While the danger presented by loose cargo may be greatest for large items of cargo on large vessels, the problems of uncontrolled motion and unpredictable tossing are actually greater for small boats which are significantly more susceptible to erratic wave action due to their generally reduced displacement and light mass.

The efffect upon equipment of a tossing boat is not just in the danger that the thrown equipment presents to the occupant of the vessel, but equally in the inconvenience and loss of utility created by rapidly shaking and tossing the container. This is especially true for those containers which by their nature are designed to maintain their contents in an organized state.

Quite possibly the ultimate example of an organized container is a tackle box on board a small fishing vessel for use on relatively open bodies of water and at sea. Tackle boxes are a relatively well developed form of the container art which have as their principal purpose the segregation, control and convenient presentation of relatively large numbers of small and dangerous objects which must be kept readily accessible and not jumbled together. The average fishing lure is dangerous to the user because of its sharp barbs and hooks; these same barbs and hooks can create a tangled and inseparable mess if lures are jumbled together.

For this reason, the designers of tackle boxes exhibit much ingenuity and spend much effort on designing compartmentalization and storage schemes that both separate and present the lures in an easy to find and remove manner. A tackle box additionally must make provision for the storage and dispensing the varying lengths of fishing line and leaders, components which are susceptible to tangling if intermingled or jumbled together.

Thus, U.S. Pat. No. 4,033,066 to Morcom discloses a fishing tackle box in which a plurality of open topped horizontal trays having distinct internal compartmentalization are interlocked for constructing a fish tackle box adapted to holding individual lures. U.S. Pat. No. 4,555,862 to Panesewich discloses a form of a fish tackle box which makes specific provision for a dispenser for a plurality of reels of fishing line or leader. U.S. Pat. No. 3,780,468 to Maffett discloses an internal structure particularly adapted to form separate compartments for receiving lures, including a specific material adapted to securing lures by their hooks.

The fisherman, having carefully segregated the lures into their indiviudal compartments in a fish tackle box, then sets forth on a boat which in normal use will pitch, heave, yaw and move, until the box and its contents are totally jumbled. It has therefore been apparent that compartmentalizing the lures in a fish tackle box is insufficient if the box itself is not secured within the vessel. The usual expedient of tying the box to the vessel is dependent upon there being a protrusion or cleat in the vessel to which the box can be secured. More elaborate structures include those as shown in Van Vuren, U.S. Pat. No. 1,929,833, in which telescopic extensions are provided within a box to be gripped to the rub rail of a boat to secure the box against movement during boat operations. Such an adaptation not only uses much of the internal space of a box, increasing its weight and size, but also depends upon there being a section of flat deck terminated in two rails to which the box might be secured; in other words, such a box is dependent on and adapted only to certain particular boat constructions.

More recently, U.S. Pat. No. 3,780,468 to Maffett disclosed a stackable fishing tackle box in which multiple sections are provided, at the bottom of each section are two parallel flanges which may be received in opposed channel tracks provided at the top of a section. Maffett also points out that the channel tracks can be affixed to a boat seat or some other portion of the boat to receive Maffett's box.

The great difficulty with this, as with other similar and channel and flange systems, is that a boat is subject to considerable banging in heavy use and that any such channel would be stepped upon, objects would be dropped upon it, and dirt and grime will be pushed into it. Since flanges and channels of the form of Maffett are dependent upon a tight fit for their functioning but must remain free in order for the box to be inserted, such damage renders the channel unusable.

More elaborate structures such as, for example, the interlocking "T" rail and channel shown in Care, U.S. Pat. No. 2,476,134 for securing a fare box on a bus, a similar if milder environment, are unsuitable for use on boats because of the injury producing potential of an extended permanently affixed channel when no tackle box is installed. In addition, "T" channels are susceptible, unless they are made so substantially large that they are unsuitable obstacles, to being damaged or bent so as to be unusable as an interlocking channel.

SUMMARY OF THE INVENTION

The invention relates to the field of securing tackle boxes or similar loads to a carrier which undergoes violent motion in use. While the particular example shown relates to fish tackle boxes upon small boats at sea, it is equally applicable to the problem of securing tool boxes to the beds of trucks; securing ice chests to boats or motor vehicles and chilled liquid containers to boats or vehicles.

In each case a container exists which is required by the nature of its use to be readily removable and portable; the container has contents that are susceptible to damage if the container is tossed or tumbled, or the container itself cannot withstand such treatment. Nonetheless, the container must be readily removable and any residual structure must be damage resisting under the anticipated use of the boat or the vehicle and must not present a hazard to persons within or on the vehicle with normal use.

The invention as disclosed comprises a support base adapted to the receiving of a mating container, in the preferred embodiment shown to be a fish tackle box. The support base comprises a base structure adapted to installation on a boat. Upon this structure are provided two parallel securing rails having an inverted truncated pyramidal cross section with a substantially wide base, externally flaring sides and a substantially flat top. The side, the top and the base are radiused so as to avoid all sharp edges, and so as to avoid any relatively thin structure. Within the removable box are provided parallel grooves of mating crosssection; the grooves having a relatively wide opening but further expanding within the material to an even wider base section. It is, however, not necessary that the grooves be radiused with the receiving box, although it would be advantageous to radius the groove at the surface to prevent damage.

It is found that with this particular combination of construction a relatively low rail can be provided for interlocking with the box, one that does not protrude into the operator's space of the vessel and thus does not present significant hazard of injury. The relatively large diameter radiusing of the edges of the rail eliminates sharp edges and thus further significantly wide base; in combination with the significant radiusing of all edges, the base creates rails which are essentially immune to damage under anticipated impacts and loads including being stepped on or having machinery, oars and equipment dropped on them. Any damage that will be suffered would be of the form that would tend to knock chips or sections out of the rail rather than deforming the rail. Likewise, there are no crevices or cracks which are likely to accumulate debris or that would resist washing; therefore little or no jamming may be expected despite the usual presence of mud, dirt and debris within a boat.

The grooves within the receiving box lock onto the rails by sliding the box long the rails. The angled, inverted prismatic shape of the rails secure the box in a downward direction against vertical motion even though the rails may be worn; this particularly is in contradistinction to a "T" cap rail, and provides for a gradual degradation of the rail under use rather than sudden failure and looseness. Thus, springs and similar loading devices to adapt for wear are not required. Further, in contradistinction to the flange and channel of the prior art, the usual form of damage to be anticipated to the rail, through impact or breaking, simply creates a missing piece of rail. The rail itself remains intact and of the same cross-sectional shape, and no significant increase in resistance to sliding the box on and off the rails will occur as a result of such wear and damage.

As a result, the invention shows an extreme resistance to the normal wear and tear of use, and retains the same ease of installation and removal that it would have when new, while retaining its strength and hold down ability.

It is, thus, an object of this invention to disclose a hold down system hold down for a loaded box for temporary attachment to a moving vehicle or vessel which is capable of functioning despite wear and damage to the hold downs;

it is a further object of this invention to show an apparatus for securing temporarily a container to a moving vehicle or vessel which retains the container despite wear to the attaching structure;

it is a further object of this invention to disclose an apparatus for attaching a container to a moving vehicle or vessel in which the apparatus poses a significantly reduced hazard to the occupant of the vehicle or vessel when the container is removed;

it is a further object of this invention to disclose an apparatus for securing a container to a vehicle or a vessel in which the apparatus is substantially resistant to damage when the container is removed;

it is a further object of this invention to show a method of attaching a container to a vehicle or a vessel in which the ease of installation or removal of the container is maintained essentially constant under conditions of increasing wear and physical damage to the attachment means;

it is a further object of this invention to show an apparatus for attaching a container to a moving vehicle or vessel in which the functioning of the apparatus is substantially unimpaired by the presence of sand, mud, oily dirt and other forms of contaminant.

BRIEF DESCRIPTION OF THE DRAWING

FIG. 3 is a sectional view showing the application of the invention on a particular form of support within the hull of the vessel.

FIG. 4 is a view of a detail of one end of a particular implementation of the invention.

FIG. 5 is a view of an alternate installation of the invention adapted for vertical mounting.

FIG. 6 is a view of an end of one rail of the invention showing a form of stop clamp.

DETAILED DESCRIPTION OF THE PREFERRED EMBODIMENT

Figure 1:
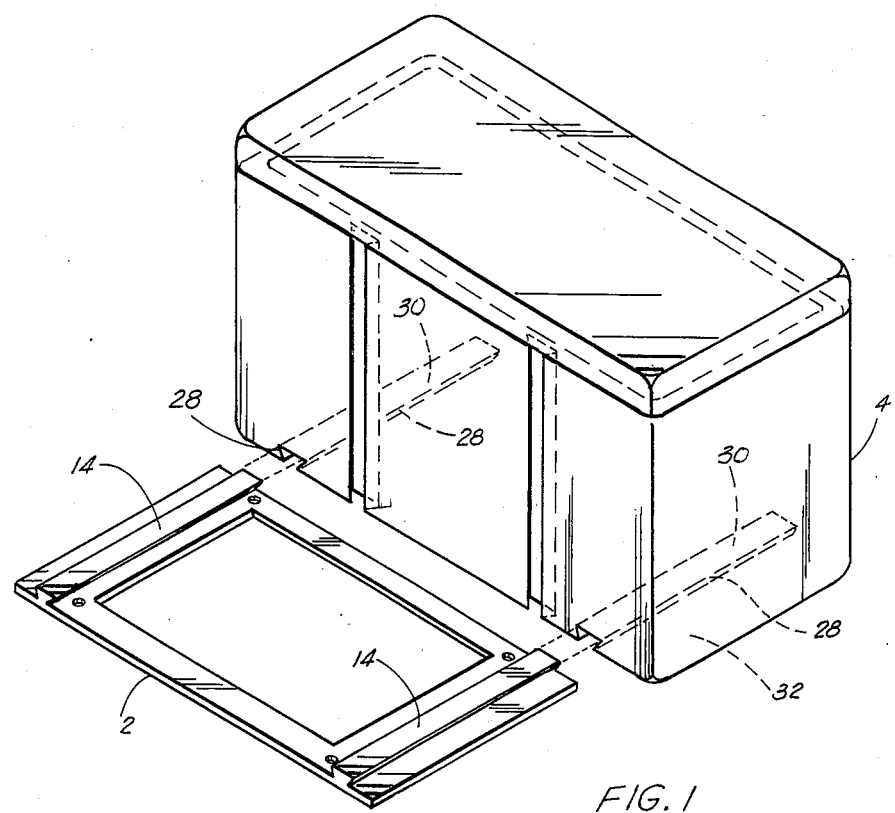
FIG. 1 is an angled view of a container adapted to the invention showing its relationship to the plate and rails of the invention.
Figure 2:
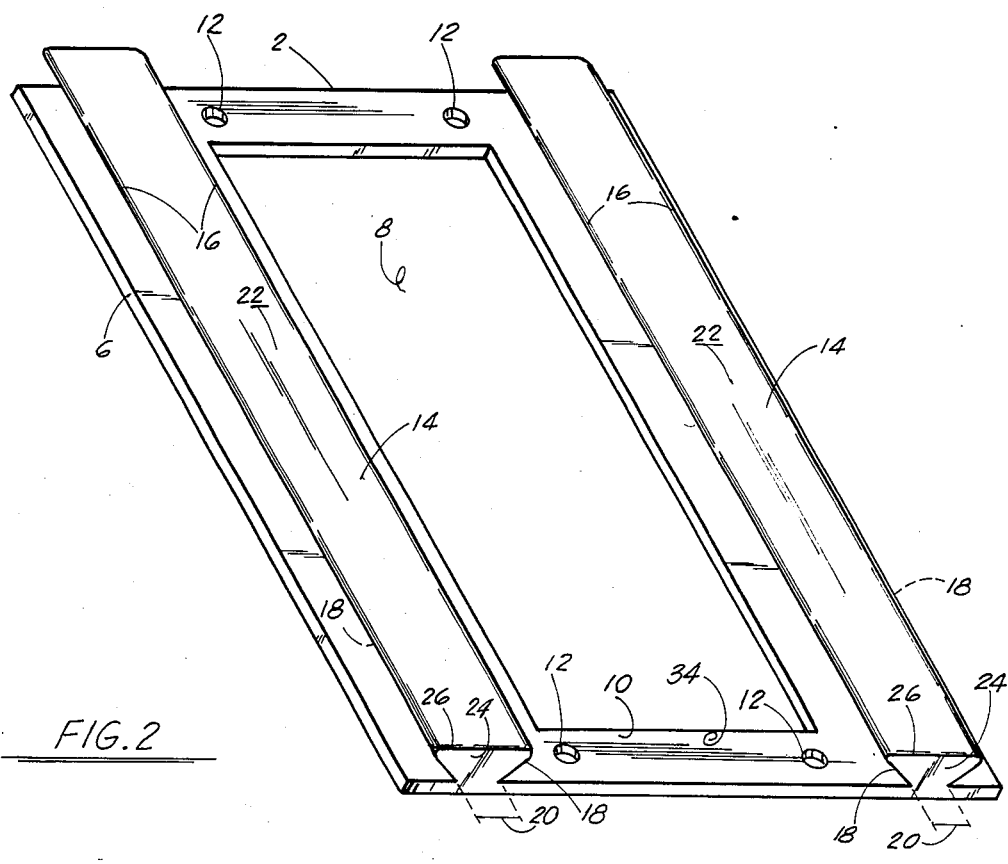
FIG. 2 is an angled view of the rails of the invention.

FIG. 1 shows, in a position of cooperative arrangement the securing apparatus or rail frame 2, as adapted for interengaging security to a box 4. Rail frame 2, shown in greater detail in FIG. 2, is seen to comprise, in cross section, a base plate 6 of generally rectangular construction. The center 8 of base plate 6 is of an open construction so as to reduce the weight and material required for the construction of base plate 6 and because it serves no particular structural purpose. Along the end edges 10 are provided a plurality of fastening holes 12 which are adapted to receive screws or similar hold down devices for fastening the rail frame to a support or to the frame of a vessel or vehicle.

Arising from rail frame 2, are two parallel support rails 14 of particular design, unique to the invention. Support rails 14 are, in cross section of a truncated prism shape having upper face 22 with two parallel upper side edges 16 intersecting with downward, inwardly sloping side faces 18 which, at a lower edge, flare into base plate 6 at a sufficient apart distance to provide an arbitrarily wide base 20. Base 20 is of a width at least one-third of the total width of upper face 22.

Upper side edges 16 are not sharp, but at the meeting of upper face 22 and side faces 18 are significantly radiused so as provide a generally round radial aspect, significantly resistant to chipping and similar shearing forces. Likewise end faces 24 which are depicted as being vertical, but preferably are significantly slanted, likewise provide at their meeting with upper face 22 a heavily radiused end edge 26. The amount of radiusing of end edge 26 and upper side edge 16 is such as to substantially eliminate all possibility of sharp edged impact injury to a person bumping or hitting rail frame 2, and this radiusing and elimination of sharp edges is considered a significant portion of the invention.

Within box 4 are provided parallel inward side faces 28 which are shaped and extend into the tackle box at a deviating angle essentially equal to the angle of side faces 18. Each pair of inward side faces 28 further define and delineate an inward support faces 30, to parallel inward support faces of a width and length substantially equivalent to the width and length of upper faces 22, and spaced a distance apart equal to upper faces 22. Unlike the side edges 16 of the rail frame, there is no necessity to provide a radiused edge at the line of intersection of inward side face 28 and inward support face 30; it is in fact preferred that this be a relatively sharp angle.

Both rail frame 2 and that portion of tackle box 4 which incorporates inward side face 28 and inward support face 30 are made of a preferably somewhat resilient material. The forces that will be imposed in normal use upon rail frame 6 mandate that it be made of a relatively stiff, resistant material such as one of the engineering plastics or of a fiberglass epoxy. Box 4's external surface, at least as to the part containing inward side faces 28 and support face 30, are preferably of a somewhat more resilient material, in the preferred embodiment of the invention of a structural urethane foam. It is desirable that for an equal amount of force inward side face 28 will deform to a greater extent than side face 18.

It is further of note that inward side face 28 is of a depth or height such that when box 4 is interoperably engaged with plate 2, that the base surface 32 of box 4 is in contacting relationship with the upper surface 34 of base plate 6.

It is often found that there is not a flat surface on a vessel or a vehicle adapted particularly to the installation of base plate 6 in a horizontal plane. Under these circumstances, as shown in FIGS. 3-5, an alternate form of the invention has support rails 14 installed in parallel upon supported plate 36. Supported plate 36 comprises attachment plate 36 containing therein a plurality of fastener holes 12 permitting the plate to be fastened and affixed by screws or the like to sloping surface 38; in the illustrative version depicted sloping surface 38 is the hull of a boat, although the invention clearly is not restricted to such.

Attachment plate 36 is connected at one end through pivoting hinge 40 to rail support 42. Rail support 42, serving the same purpose as base plate 6, is a substantially flat surface upon which arises support rail 14. On the underside of rail support 42, extending the length of rail support 14, is positioning member 44, a vertically extending member affixed to rail support 42 and containing at spaced intervals along its length a plurality of positioning holes 46.

A vertical support 48 is pivotally connected at a first end to a support hinge 50 located at a mid-point of an attachment plate 36. At the opposite end of vertical support 48 is provided a mating hole, which may be interconnected with and secured to any one of the positioning holes 46 along rail 44 by means such as a nut and bolt, so as to position rail support 42 in either a horizontal, as shown in FIG. 3, or a vertical, as shown in FIG. 5, position.

The actual positions chosen will be apparent to those skilled in the installation of accessories on boats and would be a function of the clearances and spaces available within the hull of the boat.

Whether support rails 14 are upon a base plate 6 as earlier described or along parallel rail supports 42, the rails 14 are provided at one end with an obstruction or block 52 to prevent over insertion of box 4. In its simplest form block 52 may be simply a widening of wedge rail 14, but it is apparent that any attachment which would serve to increase the width and/or height of wedge rail 14 would suffice as a block.

In order to secure a box, once inserted upon rails 14, any form of temporarily installable clip would suffice. In the preferred embodiment of the invention such a blocking clip 54 comprises a mating triangular shaped metallic clip having adapted set screw openings 56 through which one or more set screws 58, such as the thumb screw shown, serve to temporarily affix the blocking clip 54, securing box 4. In use, as is apparent from the above description, box 4 is aligned so that the support rails 14 align with the openings defined by inward side faces 28 within box 4 and engagingly slid along rails 14. Contact with block 52 fully seats box 4 leaving an exposed end of rails 14 uncovered whereby clips may then be installed to secure the box. The reverse process readily removes the box from its engaging relationship.

Of greater importance, however, when a box is removed, rails 14, due to its substantially radiused edges and substantially broad based flattened structure, are essentially immune to crimping from being stood upon or from the impact of loads or shifting cargoes within the boat. The substantial radiusing significantly reduces the susceptibility of rails 14 to chipping. It will, however, occur that the forces of wear and tear, whether the sandy and generally abrasive environment found upon a boat, or the impact of cargo, will locally damage rails 14. The particular construction of rails 14, having an upward and outwardly prismatic shape would restrict such damage to abrasion and to chipping or local loss of material. By making base 20 a substantially wide portion of the overall width of the wedge rail 14, the rail 14 is essentially immune to being bent, and any force sufficient to break the rail off would be well beyond ordinary wear and tear, as it would represent a force sufficient to damage the vessel itself.

By creating the wedge rail 14 out of a material somewhat harder than the mating portion of box 4 and by providing that the side faces 28 of box 4 are of a material having some deflection under force the effects of this wear and damage on wedge rail 14 through continued use are almost completely ameliorated. The absence of material as would occur from a chip simply does not affect the installation and strength of box 4 in any material manner. Further, by maintaining the inward edges between faces 28 and 30 on tackle box 4 at a sharper angle than the radiused upper side edges 16 of rails 14 a gripping efect is produced so that even after wear a continuous grip under load is provided to box 4 preventing shifting and vibration, a problem in the older "T" shaped rails that can only be solved by the providing of springs or loading devices.

It can, thus, be seen from the description that the invention provides a particularly advantageous method and apparatus for mounting temporarily a box or container upon a non-level surface and securing it against the motion of the supporting vessel or vehicle. The invention further identifies and addresses the problem of safety to crew and equipment when the tackle box is removed exposing the support rails and equally addresses the problem of wear and tear upon the support rail which should be expected in normal use but which should not degrade the operability of the support rails.

It should thus be apparent that the invention is not restricted to the particular embodiment as shown but extends to that wider range of equivalent as claimed. Particularly, although a tackle box upon a boat has been used as the exemplar example, it is apparent that the structure as shown is particularly advantageous to the support of coolers and drink containers on both vessels and on vehicles, permitting the ready and easy installation and removal of the container while positively and firmly securing it against all expected motions of the vehicle.

It is further obvious that the bottom structure of box 4 may be molded into the box, or provided as a plate for attachment to an existing box to adapt it to the support attachments.

I claim:

1. Means for anchoring a box upon a surface of a moving support comprising:
   a. a support plate adapted to fixed attachment to said surface;
   b. two parallel rail members arising from said support plate, spaced a distance apart;
   c. each of said rail members having a planar top face a spaced distance from said support plate;
   d. said top face connecting to said support face along two inwardly sloping, planar side faces, said top face and said inwardly sloping side faces defining a truncated pyramidal cross section, defining a base width connection to said plate;
   e. said base width having a width being a substantial function of said top face;
   f. the intersection of said top face and said side faces being radiused;
   g. said parallel rails interlocking with a box mounted base, said box mounted base comprising a pair of parallel first and second outwardly sloping inwardly projecting side faces, at an angle parallel to said inwardly sloping planar side faces, said outwardly sloping side faces defining an inward support face, said outwardly sloping side faces and said inward support face defining a second truncated pyramidal cross section equivalent in dimension to said first truncated pyramidal cross section.

2. The apparatus of claim 1 wherein said box mount side faces are comprised of a material having a greater resilience than said parallel rails.

3. The apparatus of claim 1 wherein said box mount outwardly sloping side faces extend a distance such that when said inward support face is in contacting relationship with said parallel rail top face, said box is in contacting relationship with said support plate.

4. The apparatus of claim 1 wherein box mounted base further comprises:
   a. a plate attached to the base of said box.

5. The apparatus of claim 1 wherein said support plate further comprises:
   a. two angular support means, each comprising:
      a. mounting means, adapted for affixed mounting to said support surface;
      b. a base plate rail hingedly affixed at one end to said mounting means;
      c. means for establishing a fixed angular relationship between said base plate rail and said mounting means;
      d. one of said parallel rails being fixedly mounted atop each said support rails;
      e. said mounting means being affixed so as to maintain said rails parallel.

* * * * *